United States Patent
Jung

(10) Patent No.: US 9,471,097 B2
(45) Date of Patent: Oct. 18, 2016

(54) DISPLAY DEVICE

(71) Applicant: Samsung Display Co., Ltd., Yongin, Gyeonggi-Do (KR)

(72) Inventor: Youn Hwan Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 147 days.

(21) Appl. No.: 13/935,427

(22) Filed: Jul. 3, 2013

(65) Prior Publication Data

US 2014/0192463 A1   Jul. 10, 2014

(30) Foreign Application Priority Data

Jan. 9, 2013  (KR) .................. 10-2013-0002600

(51) Int. Cl.
*G06F 1/16*   (2006.01)

(52) U.S. Cl.
CPC ........... *G06F 1/1601* (2013.01); *G06F 1/1652* (2013.01)

(58) Field of Classification Search
CPC .................................................... G06F 1/1601
USPC .................................................... 361/679.21
See application file for complete search history.

(56) References Cited

U.S. PATENT DOCUMENTS

| | | | | |
|---|---|---|---|---|
| 7,826,006 B2 * | 11/2010 | Koganezawa | .................. | 349/64 |
| 8,045,272 B2 * | 10/2011 | Park | .......................... | G02B 3/02 359/625 |
| 8,853,941 B2 * | 10/2014 | Jung | ..................... | G06F 1/1637 313/504 |
| 2004/0252374 A1 * | 12/2004 | Saishu | ............... | G02B 27/2214 359/462 |
| 2006/0001796 A1 * | 1/2006 | Chang | ................. | G02F 1/13336 349/95 |
| 2007/0216702 A1 * | 9/2007 | Takahashi | ............... | H04N 5/64 345/582 |
| 2009/0102990 A1 * | 4/2009 | Walton | .................. | G02F 1/1323 349/15 |
| 2010/0239823 A1 | 9/2010 | Tho et al. | | |
| 2010/0330497 A1 | 12/2010 | Ichikawa et al. | | |
| 2011/0205454 A1 * | 8/2011 | Kim et al. | ..................... | 348/836 |
| 2011/0242686 A1 * | 10/2011 | Watanabe | .......... | G02B 17/0884 359/804 |
| 2012/0049718 A1 * | 3/2012 | Watanabe | ........... | G02F 1/13336 313/110 |
| 2012/0081874 A1 | 4/2012 | Wu et al. | | |
| 2012/0091923 A1 | 4/2012 | Kastner-Jung et al. | | |
| 2012/0229431 A1 * | 9/2012 | Hiroki | .................... | G09G 3/003 345/204 |
| 2012/0275097 A1 * | 11/2012 | Lee | ........................ | G06F 1/1601 361/679.01 |
| 2013/0002583 A1 * | 1/2013 | Jin | ........................ | G06F 1/1637 345/173 |

FOREIGN PATENT DOCUMENTS

| | | |
|---|---|---|
| JP | 2012-078825 A | 4/2012 |
| KR | 10-2010-0058944 A | 6/2010 |
| KR | 10-2010-0105241 A | 9/2010 |
| KR | 10-2011-0106349 A | 9/2011 |

* cited by examiner

*Primary Examiner* — Tuan T Dinh
*Assistant Examiner* — Rockshana Chowdhury
(74) *Attorney, Agent, or Firm* — Lewis Roca Rothgerber Christie LLP

(57) ABSTRACT

A display device includes a display panel including a display area configured to display an image and a non-display area adjacent to the display area; a front panel that is substantially transparent and on a front surface of the display panel; and a blind between the display panel and the front panel at a portion of the non-display area, wherein the blind includes a plurality of strips spaced apart from each other and adjacent ones of the strips are at least partially overlapped with each other when viewed in at least one direction.

9 Claims, 3 Drawing Sheets

DISPLAY DEVICE

CROSS-REFERENCE TO RELATED APPLICATION

This application claims priority under 35 U.S.C. §119 to and the benefit of Korean Patent Application No. 10-2013-0002600, filed on Jan. 9, 2013, the contents of which are hereby incorporated by reference in their entirety.

BACKGROUND

1. Field

The present disclosure relates to a display device.

2. Description of the Related Art

In recent years, a flat panel display device (e.g., a liquid crystal display or a plasma display panel) has superior characteristics, such as high definition, ultrathin thickness, light weight, wide viewing angle, etc.

When the flat panel display device is installed in an outdoor plaza (e.g., a public place) or an indoor plaza (e.g., airport, train terminal, bus station, etc.), an image displayed in the flat panel display device can be clearly perceived by passersby in the viewing angle of the flat panel display device, but the image is not perceived by passersby outside the viewing angle of the flat panel display device, i.e., left and right sides or a rear side of the flat panel display device.

Accordingly, a display device, which provides the image to a viewer in various directions, has been developed (e.g., a flexible display device).

SUMMARY

The present disclosure provides a flexible display device capable of providing an image with a high quality.

Embodiments of the inventive concept provide a display device including a display panel including a display area configured to display an image and a non-display area adjacent to the display area; a front panel that is substantially transparent and on a front surface of the display panel; and a blind between the display panel and the front panel at a portion of the non-display area, wherein the blind includes a plurality of strips spaced apart from each other, and adjacent ones of the strips are at least partially overlapped with each other when viewed in at least one direction.

The display area may have a generally rectangular shape and the display panel may include a first region that is substantially flat and a second region that is curved in a direction toward a rear surface of the display panel along at least one side of the rectangular shape.

The blind may be at the second region.

Each of the strips may include an upper surface substantially parallel to a plane of an upper surface of the display panel in the first region.

The front panel may include a concavo-convex part extended in the one direction and the strips may be at a predetermined area.

The strips may extend along a side of the display area.

The concavo-convex part may have a plurality of prism mountains, each of the prism mountains including a first surface facing a first direction and a second surface coupled to the first surface and facing a second direction different from the first direction. The strips are on the first surfaces of the prism mountains.

The front panel may be partially recessed to form the concavo-convex part.

The display device may further include a light blocking layer at an area in which the adjacent ones of the strips are not overlapped with each other, the light blocking layer substantially surrounding the display area, and the blind is between the display area and the light blocking layer.

The display panel and the front panel may be bent.

An adhesive layer may be between the display panel and the front panel.

According to the above, the display device may provide substantially the same image to a viewer regardless of the viewing angle of the viewer.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
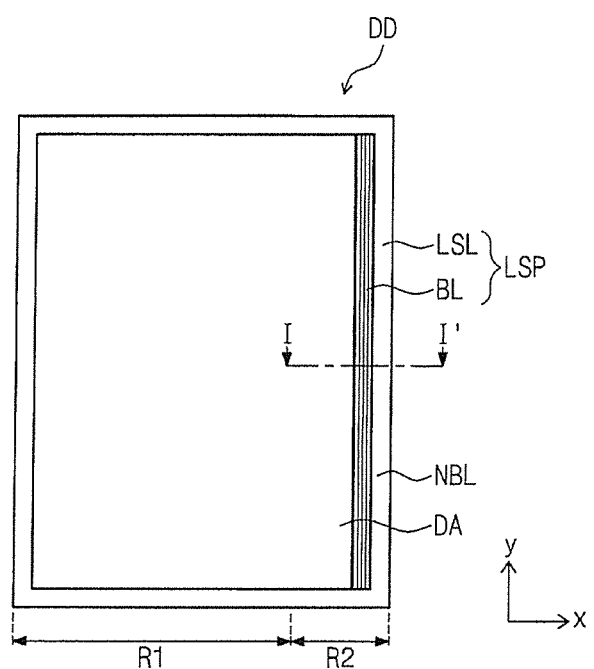
FIG. 1 is a plan view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 2:
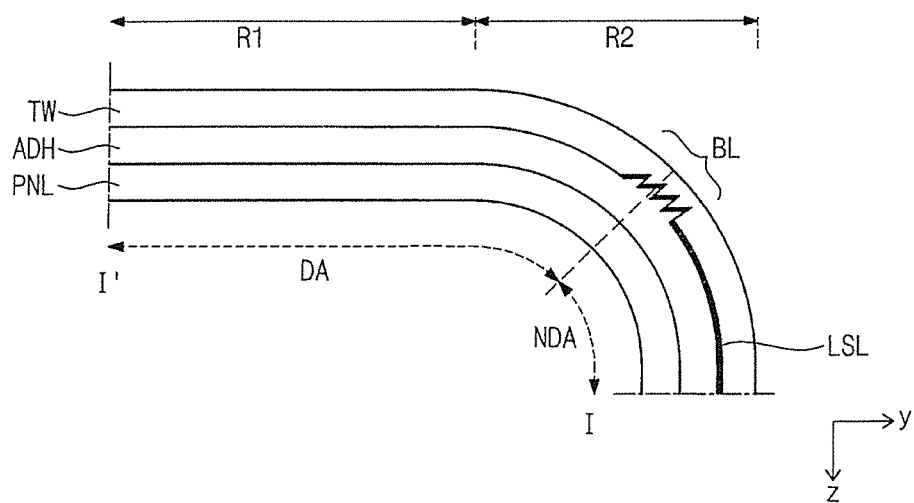
FIG. 2 is a cross-sectional view taken along the line I-I' of FIG. 1.
Figure 3:
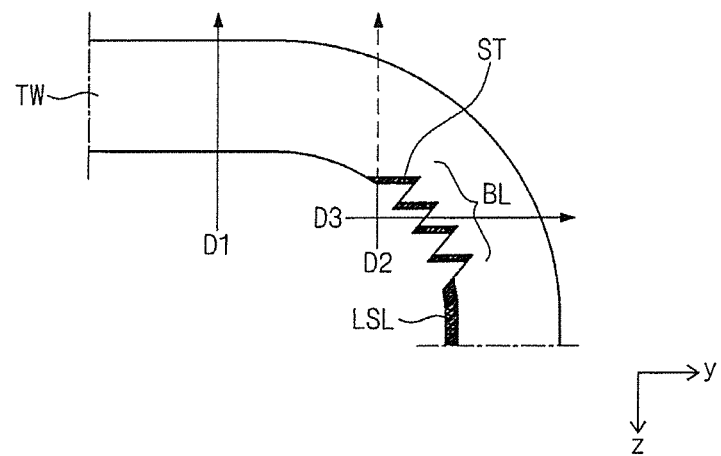
FIG. 3 is a cross-sectional view showing a portion of a front substrate and a light blocking part shown in FIG. 2.

FIG. 1 is a plan view showing a display device according to an exemplary embodiment of the present disclosure, FIG. 2 is a cross-sectional view taken along the line I-I' of FIG. 1, and FIG. 3 is a cross-sectional view showing a portion of a front substrate and a light blocking part shown in FIG. 2.

Referring to FIGS. 1 to 3, a display device DD includes a display panel PNL, a front panel TW located on a front surface of the display panel PNL, and a light blocking part LSP located between the display panel PNL and the front panel TW.

The display panel PNL displays an image. The display panel PNL may be an organic light emitting display panel, a liquid crystal display panel, an electrowetting display panel, or an electrophoretic display panel.

The display panel PNL may have a rectangular plate shape with two pairs of sides meeting at right angles, and one of the two pairs of sides may be longer than the other. In the present exemplary embodiment, the display panel PNL has the rectangular plate shape of a pair of long sides and a pair of short sides. A direction in which the long sides are extended will be referred to as a y-axis direction, a direction in which the short sides are extended will be referred to as an x-axis direction D2, and a direction substantially perpendicular to the x- and y-axis will be referred to as a z-axis direction. Here, the z-axis direction indicates a rear surface direction of the display panel PNL.

The display panel PNL includes a display area DA in which the image is displayed and a non-display area NDA located adjacent to at least a side of the display area DA. A plurality of pixels is provided in the display area DA to display the image, but no pixel is provided in the non-display area NDA. Accordingly, the image is not displayed in the non-display area NDA. The display area DA has a rectangular shape with sides substantially in parallel to the short sides or the long sides of the display panel PNL. The non-display area NDA is located at both sides of the display area DA or positioned to surround the display area DA when viewed in a plan view.

The display panel PNL may have flexibility. That is, the display panel PNL may be manufactured at first to have a flat or curved shape, but the display panel PNL may be provided in (e.g., flexed or bent into) various shapes different from the initial shape after being manufactured. Alternatively, the display panel PNL may be manufactured to have the curved shape at first, but has rigidity without flexibility.

The display panel PNL may be partially bent to the rear surface direction. In the present exemplary embodiment, the portion corresponding to at least one side of the display panel PNL may be bent to the rear surface direction. However, the display panel PNL may be bent in various ways. For instance, when assuming that a flat area of the display panel PNL is a first region R1 and a curved area of the display panel PNL to the rear surface direction is a second region R2, the second region R2 is provided to the pair of the long sides or one short side.

In the present exemplary embodiment, FIGS. 1 and 2 show the display panel PNL in which the portion is bent to the rear surface direction, i.e., the z-axis direction, along the x-axis direction. Particularly, when the display panel PNL is cut along the x-axis direction, the cross section of the display panel PNL is curved at a predetermined curvature, but it should not limited thereto or thereby. That is, according to embodiments, the display panel PNL may be bent in the y-axis direction in which the long sides are extended, in both the x- and y-axis directions, or in a direction other than the x- and y-axis directions.

The front panel TW is located on an entire surface (or substantially the entire surface) of the display panel PNL to protect the display panel PNL, and formed of a transparent material to allow the image to be perceived by the viewer. The front panel TW is formed of a transparent insulating material, such as glass, plastic, crystal, etc.

When viewed in a plan view, the front panel TW has the substantially same shape as the display panel PNL and covers the entire surface of the display panel PNL. In the present exemplary embodiment, the front panel TW has the same rectangular shape as that of the display panel PNL and is overlapped with the display panel PNL.

When viewed in a cross-sectional view, the front panel TW may have the substantially same shape as the display panel PNL. For instance, when the display panel PNL is bent, the front panel TW may be bent to have the same shape as the display panel PNL, such that the contour of the front panel TW follows along the contour of the display panel PNL.

The front panel TW includes a concavo-convex part on which a blind is provided. The concavo-convex part will be described later.

The light blocking part LSP is provided between the display panel PNL and the front panel TW when viewed in a cross-sectional view and located on a rear surface of the front panel TW. The light blocking part LSP is positioned to correspond to the non-display area NDA of the display panel PNL when viewed in a plan view.

The light blocking part LSP includes the blind BL that blocks light to different degrees depending on a viewing angle of the viewer and a light blocking layer LSL that blocks the entirety of the light (or substantially all of the light) provided to the front panel TW.

The blind BL is positioned to correspond to a portion of the second region R2 of the display panel PNL, and is located adjacent to the display area DA of the display panel PNL when viewed in a plan view.

The blind BL has a shape like a Venetian blind (e.g., having a plurality of strips ST extending in the x or y direction that partially overlap when the front panel TW is bent in the z direction) and blocks the light in substantially the same way as the Venetian blind. For example, according to the present exemplary embodiment, the blind BL includes a plurality of strips ST. Each of the strips ST is extended in the same direction and has a plate-like shape with a uniform or substantially uniform width (e.g., a predetermined width).

The strips ST are arranged to allow upper surfaces thereof to be spaced apart from each other at intervals (e.g., predetermined intervals) and extend in the x or y direction such that the strips ST are substantially in parallel to each other. When viewed in one direction, adjacent strips ST are at least partially overlapped with each other. For instance, the upper surfaces of the strips ST are arranged to be substantially in parallel to the upper surface of the display panel PNL in the first region R1, i.e., an x-y plane. In particular, when the viewer watches the display panel PNL from the front of the display panel PNL, the strips ST adjacent to each other make contact with each other or are partially overlapped with each other.

The strips ST may be arranged in a direction vertical to (e.g., perpendicular with respect to) the z-axis direction, to which the second region R2 is bent, along an end portion of the display area DA. That is, the strips ST may extend in the y-axis direction.

In the present exemplary embodiment, the upper surfaces of the strips ST are substantially in parallel to the upper surface of the first region R1 of the display panel PNL, but they should not be limited thereto or thereby. The upper surfaces of the strips ST may be inclined with respect to the upper surface of the first region R1. The degree of the inclination of the strips ST may be changed depending on the curvature of the display panel PNL and the viewing angle of the viewer.

The blind BL may be manufactured separately from the manufacture of the front panel TW and the display panel PNL and positioned between the front panel TW and the display panel PNL, but the blind BL may be formed on the concavo-convex part of the front panel TW according to the present exemplary embodiment.

When viewed in a plan view, the concavo-convex part is provided on the front panel TW between the display area DA and the light blocking part LSP. The concavo-convex part is concave and convex from the rear surface of the front panel TW.

The concavo-convex part has a shape in which a plurality of prism mountains is arranged. The prism mountains are extended in the same direction as the strips ST, and thus the prism mountains are extended substantially in parallel to the long sides of the display area DA. In this case, each prism mountain includes a first surface facing one direction and a second surface coupled to the first surface and facing the other direction different from the one direction, and the strips ST are located on the first surfaces of the prism mountains in a one-to-one correspondence.

An angle between the rear surface of the front panel TW and the first and second surfaces of the prism mountains may be varied depending on the arrangement of the strips ST. In the present exemplary embodiment, the upper surfaces of the strips ST are formed to be substantially parallel to the extended surface of the first region R1 of the display panel PNL, but they should not be limited thereto or thereby. For instance, the angle of the first and second surfaces of the prism mountains may be controlled to allow the upper surfaces of the strips ST to be inclined to the extended surface of the first region R1 of the display panel PNL.

In addition, the concavo-convex part has the shape of the prism mountains such that the strips ST are located on the surface of the concavo-convex part, but it should not be limited thereto or thereby. That is, the concavo-convex part may have various shapes as long as the strips ST are arranged in the above-mentioned arrangement.

The concavo-convex part is formed by processing the front panel TW in the form of intaglio or engraving form after the front panel TW is formed. In the case that the front panel TW is manufactured by an injection molding method, the concavo-convex part may be substantially simultaneously formed with the front panel TW.

The concavo-convex part is used to relatively easily form the strips ST, and the strips ST are formed by printing a light blocking material on the first surfaces of the prism mountains.

The light blocking part LSP is located in the non-display area NDA of the front panel TW. The light blocking part LSP is located in the non-display area NDA except for the area in which the blind BL is located. The light blocking part LSP covers the non-display area NDA except for the area in which the blind BL is located. The light blocking part LSP may be provided on the rear surface of the front panel TW. The light blocking part LSP may be formed by a printing method and formed through the same process applied to form each strip ST of the blind BL.

An adhesive layer ADH is provided between the display panel PNL and the front panel TW. The adhesive layer ADH attaches the display panel PNL to the front panel TW. Here, the adhesive layer ADH is positioned between the blind BL and the display panel PNL in the area corresponding to the non-display area NDA of the display panel PNL and between the light blocking layer LSL and the display panel PNL to attach the parts to each other.

In the display device employing the blind BL having the above-mentioned structure, when the viewer watches the display device from the front of the display device, the light D1 or the image provided through the display area DA is perceived by the viewer, but the light D2 is blocked (or substantially blocked) by the strips ST and the light blocking layer LSL. Accordingly, the light D2 is not perceived by the viewer. Different from the above, when the viewer watches the display device from the side of the display device, the light D3 or the image provided through the display area DA travels between the strips ST, and thus the light D3 or the image is perceived by the viewer. In addition, although not shown in the figures, when the viewer watches the display device from the side of the display device, the light passing through the non-display area NDA is blocked by the light blocking layer LSL.

Figure 4A:
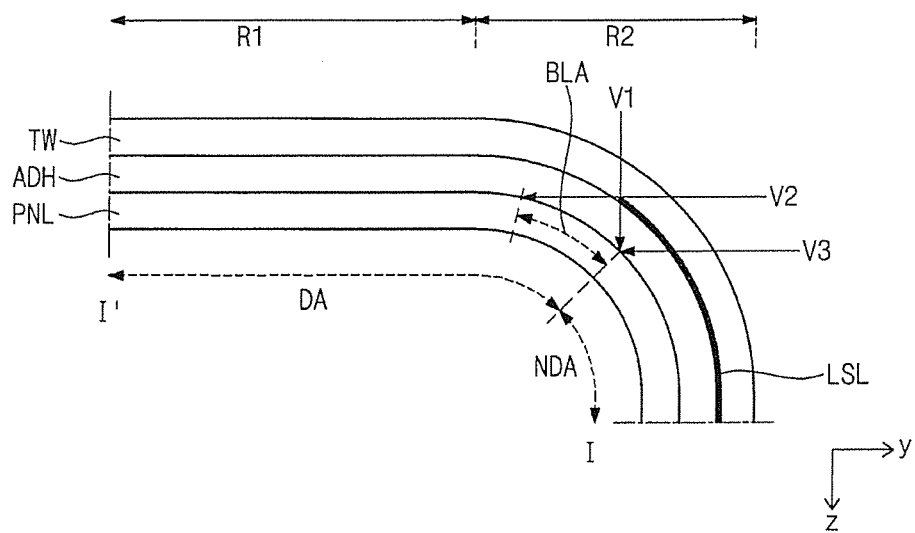
FIG. 4A is a cross-sectional view showing an image perceived by a viewer when a flexible display device does not employ a blind.
Figure 4B:
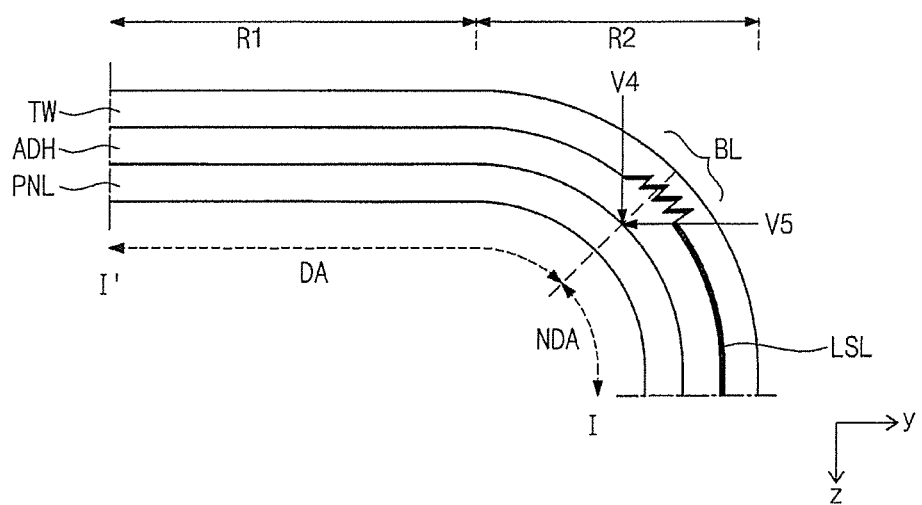
FIG. 4B is a cross-sectional view showing an image perceived by a viewer when a flexible display device employs a blind.

FIG. 4A is a cross-sectional view showing the image perceived by the viewer when the flexible display device does not employ the blind and FIG. 4B is a cross-sectional view showing the image perceived by the viewer when the flexible display device employs the blind.

Referring to FIG. 4A, the light blocking layer LSL is positioned to cover the non-display area NDA when the viewer watches the display device not employing the blind BL from the front of the display panel PNL.

In this case, the viewer who watches the display device from the front of the display device perceives the image displayed in a first position V1 corresponding to an end portion of the display area DA of the display panel PNL within the display area DA of the display panel PNL. When the viewer watches the display device from the side of the display device, the viewer perceives the image displayed in a second position V2 corresponding to an end portion of the display area DA of the display panel PNL.

Therefore, when the viewer watches the display device from the side of the display device, a defect, in which a portion of the image corresponding to the end portion of the display area DA is not perceived by the viewer, occurs as compared when the viewer watches the display device from the front of the display device. That is, the image at a third position V3 in a blocking area BLA between the first position V1 and the second position V2 is not perceived by the viewer. Thus, the image perceived by the viewer is changed depending on the viewing angle of the viewer.

Referring to FIG. 4B, the blind BL and the light blocking layer LSL are sequentially positioned to cover the non-display area NDA when the viewer watches the display device employing the blind BL from the front of the display device.

In this case, when the viewer watches the display device from the front of the display device, the viewer perceives the image displayed in a fourth position V4 corresponding to an end portion of the display area DA of the display panel PNL within the display area DA of the display panel PNL. That is, the non-display area NDA is completely covered when the viewer watches the display device from the front of the display device. In this case, the strips ST adjacent to each other make contact with each other without being spaced apart from each other or are partially overlapped with each other.

Meanwhile, when the viewer watches the display device from the side of the display device, the viewer perceives the image displayed in a fifth position V5 corresponding to an end portion of the display area DA of the display panel PNL. This is because the display panel PNL is perceived by the viewer in the direction inclined to or parallel to the upper surfaces of the strips ST when the upper surfaces of the strips ST are arranged substantially in parallel to each other and spaced apart from each other.

Thus, the image perceived by the viewer when the viewer watches the display device from the front of the display device is substantially the same as the image perceived by the viewer when the viewer watches the display device from the side of the display device, and no portion of the image may be covered (e.g., blocked) by the light blocking layer LSL. In addition, when the viewer watches the display device from the side of the display device, which is inclined to the front of the display device, the portion of the image covered by the light blocking layer LSL is smaller than that when the blind BL does not exist even though the image is partially covered by the strips ST.

Consequently, the display device employing the blind BL having the above-mentioned structure may reduce the difference between the image when the viewer watches the display device from the front of the display device and the image when the viewer watches the display device from the side of the display device. Particularly, coverage or blockage of the portion of the image displayed in the area at the end portion of the display area may be reduced when the viewer watches the display device from the side of the display device.

Although the exemplary embodiments of the present invention have been described, it is understood that the present invention should not be limited to these exemplary embodiments but various changes and modifications can be made by one ordinary skilled in the art within the spirit and scope of the following claims and their equivalents.

What is claimed is:

1. A display device comprising:
    a display panel comprising a first region that is substantially flat and a second region that is curved toward a rear surface of the display panel;
    a front panel that is substantially transparent and on a front surface of the display panel; and
    a blind disposed between the display panel and the front panel,
    wherein the second region is disposed along at least one side of the first region,
    wherein the blind is disposed on the second region,
    wherein the blind comprises a plurality of strips spaced apart from each other in a second direction and extending in a first direction, and upper surfaces of adjacent ones of the strips are at least partially overlapped with each other when viewed in the second direction perpendicular to the first direction,
    wherein the upper surfaces of the strips are substantially parallel to each other,
    wherein the upper surfaces of the strips are substantially parallel to a plane of an upper surface of the first region of the display panel, and
    wherein the upper surfaces of the strips are non-coplanar.

2. The display device of claim 1, wherein the first region has a display area configured to display an image, and
    wherein the display area has a generally rectangular shape.

3. The display device of claim 1, wherein the front panel comprises a concavo-convex part extended in the second direction and the strips are at a predetermined area.

4. The display device of claim 3, wherein the strips extend along a side of a display area.

5. The display device of claim 3, wherein the concavo-convex part has a plurality of prism mountains, each of the prism mountains comprising a first surface facing the second direction and a second surface coupled to the first surface and facing another direction different from the first direction, and the strips are on the first surfaces of the prism mountains.

6. The display device of claim 5, wherein the front panel is partially recessed to form the concavo-convex part.

7. The display device of claim 2, further comprising a light blocking layer at an area in which the adjacent ones of the strips are not overlapped with each other, the light blocking layer substantially surrounding the display area, wherein the blind is between the display area and the light blocking layer.

8. The display device of claim 1, wherein the display panel and the front panel are bent.

9. The display device of claim 1, further comprising an adhesive layer between the display panel and the front panel.

* * * * *